XR 2,727,214 189225
CROSS REFERENCE
SEARCH ROOM
Dec. 13, 1955 H. J. McSKIMIN 2,727,214
ACOUSTIC DELAY LINE USING SOLID RODS
Filed Nov. 2, 1949 3 Sheets-Sheet 1
333/141
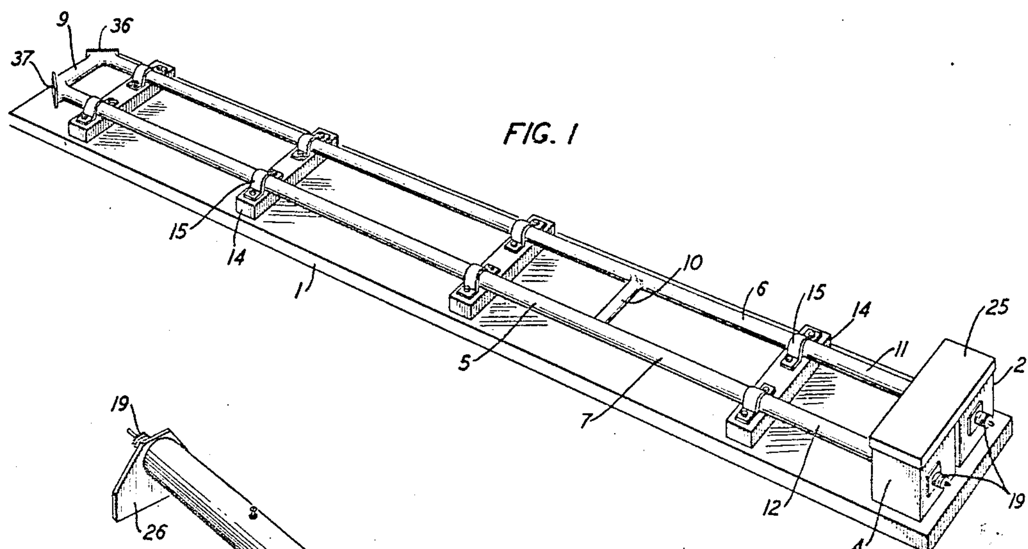
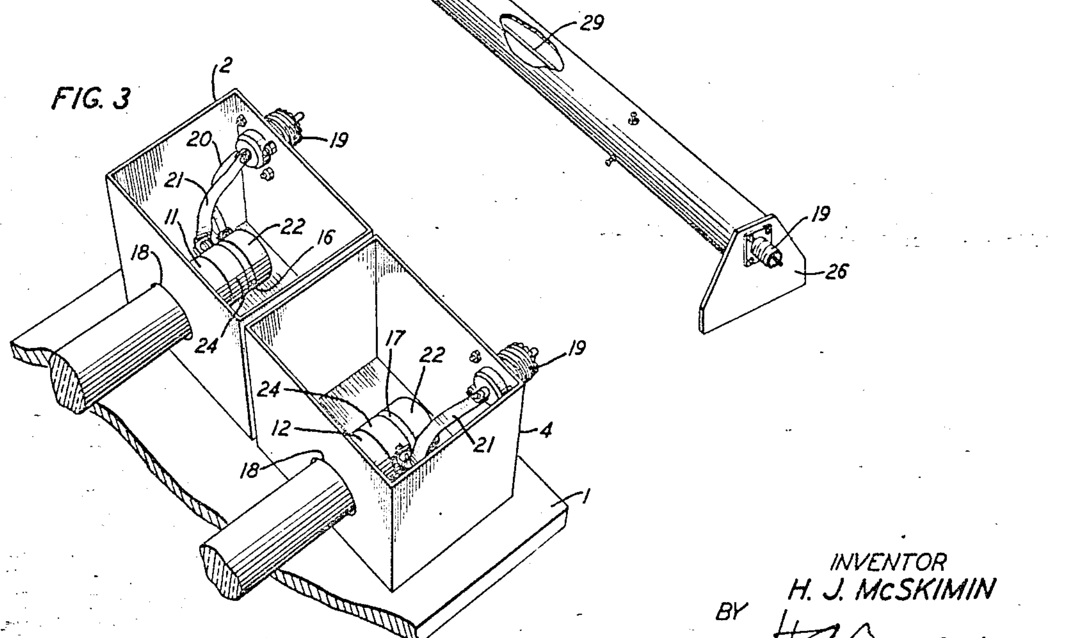
INVENTOR
H. J. McSKIMIN
BY H. A. Burgess
ATTORNEY
2727214
OR IN 333/30R

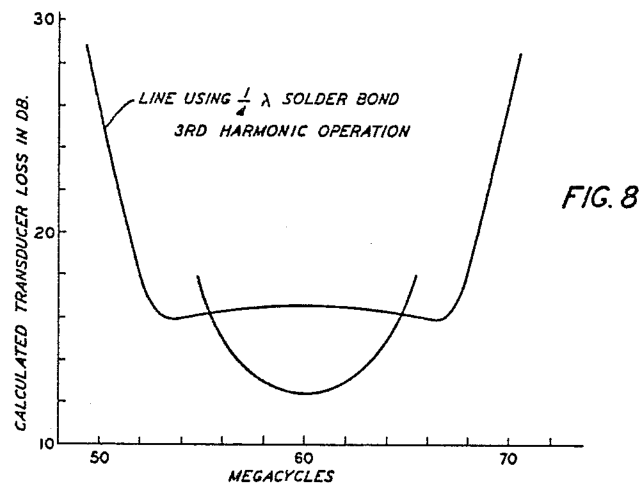
FIG. 8
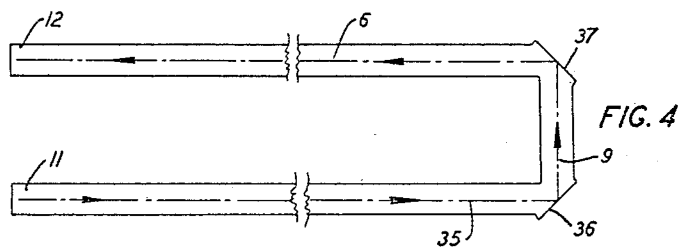
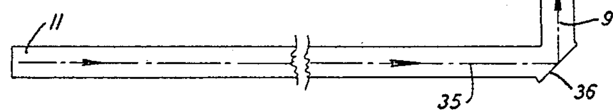
FIG. 4
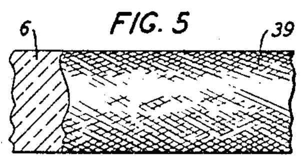
FIG. 5
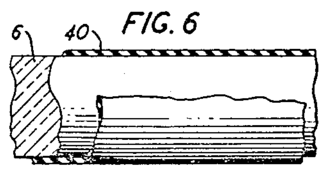
FIG. 6
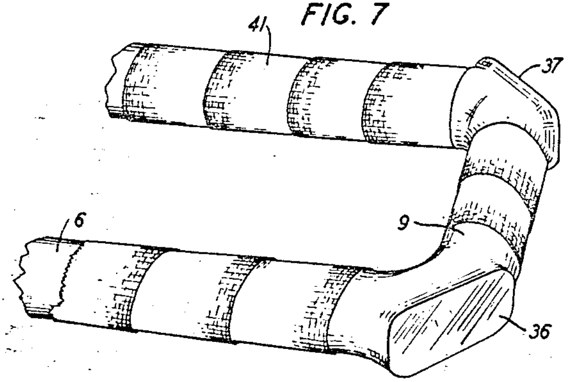
FIG. 7
INVENTOR
H. J. McSKIMIN
BY H. A. Burgess
ATTORNEY

ACOUSTIC DELAY LINE USING SOLID RODS

INVENTOR
H. J. McSKIMIN
BY H. A. Burgess
ATTORNEY

United States Patent Office 2,727,214

Patented Dec. 13, 1955

2,727,214

ACOUSTIC DELAY LINE USING SOLID RODS

Herbert J. McSkimin, Basking Ridge, N. J., assignor to Bell Telephone Laboratories, Incorporated, New York, N. Y., a corporation of New York Application November 2, 1949, Serial No. 125,049

8 Claims. (Cl. 333—30)

This invention relates to delay lines, and particularly to a line utilizing a solid rod as the medium for the transmission of ultrasonic vibrations.

It is an object of the invention to provide an improved form of delay line in which the means for effecting retardation include a solid wave transmission member.

The delay line is an instrument which retards an electrical signal for a known period, and then delivers it for subsequent use in a circuit. In most cases it is desirable that the delayed pulse be delivered without substantial distortion of the wave form. Delay lines find such diverse applications as in moving target indicators for radar use, in the production of more "natural" tones in broadcasting from sound-proofed studios by simulating the echoes normally produced in an auditorium, and in providing the "memory" in electrical devices for solving complex problems.

In the delay line disclosed in this application, the electrical signal to be delayed is impressed on a piezoelectric crystal transducer, frequently operating in the megacycle range because of the band-width requirements. This sets up an ultrasonic mechanical vibration in the crystal, which is communicated to a transmitting medium of known length. After passage through the transmitting medium, the ultrasonic vibrations are impressed on a receiving piezoelectric crystal, which converts them back into electrical impulses corresponding to the original signal. The velocity of propagation of the ultrasonic vibrations is so small, compared with that of electrical impulses, that a signal reaching a certain point in the circuit through wholly electrical paths will arrive a substantial length of time before one reaching that point through a path including a mechanically conducting element.

Liquids have been used successfully as the medium for transmitting ultrasonic vibrations, and particularly mercury, which has a very low loss factor. For certain applications, however, such as portable uses, a solid delay line would be superior. The mercury line is not well suited to rough field use because of the problems presented by its weight and the fragility of the crystals, and because of the difficulty of preventing contamination of the mercury and other components. Even minute amounts of dissolved or trapped air, moisture, and dirt, may cause serious intreference with the proper functioning of such a line. A solid line is superior in ruggedness and ease of maintenance to a liquid line. The solid line is also superior in regard to its acoustic attenuation characteristics, the loss varying with the first power, rather than the square, of the frequency—for frequencies at which scattering is negligible—so that operation may be at higher frequencies, and compensating networks, if required at all, will be less complicated. Temperature stability is also superior in the solid line, fused silica having a temperature coefficient of delay of about —70 parts per million per degree centigrade, as compared with 340 for mercury, and higher values for other liquids. Prior attempts to make a solid delay line, however, have been unsuccessful, for reasons which will appear more fully in the discussion of the various features of the present invention.

The present invention lies in the discovery of means for making and using a solid line successfully: it includes among its features "folding" the line without destroying the shape of the transmitted waves, reducing end-to-end reflections, improving and flattening the pass band, suppressing trailing pulses, and other features of improvement to be discussed below.

These and other features of the invention may be particularly understood with reference to the drawings in which:

Fig. 1 is a perspective view of a folded solid delay line constructed in accordance with the invention;

Fig. 2 is a perspective view of an alternative form of solid delay line incorporating the invention;

Fig. 3 is a detailed view, partially in section, of the terminal portion of the embodiment of Fig. 1;

Fig. 4 is a schematic view of a portion of the folded line embodied in Fig. 1;

Fig. 5 is a fragmentary view, partially in section, of a portion of line of the type illustrated in Fig. 2, showing a preferred form of surface treatment for the suppression of trailing pulses where longitudinal waves are used and for smoothing the pass band where transverse waves are used;

Fig. 6 is a fragmentary sectional view of the line of Fig. 1, showing a preferred form of surface treatment for improving the transmission of transverse waves;

Fig. 7 is a fragmentary perspective view of the line of Figs. 1 and 4, showing another preferred surface treatment for improving the transmission of transverse waves, and details of the construction of the folded portion of that line;

Fig. 8 is a graph showing the calculated transducer loss in the 60-megacycle range as a function of frequency for lines with and without a quarter-wave solder bond between the crystal and the solid transmitting medium and with the crystal operating at the third harmonic;

Figure 9:
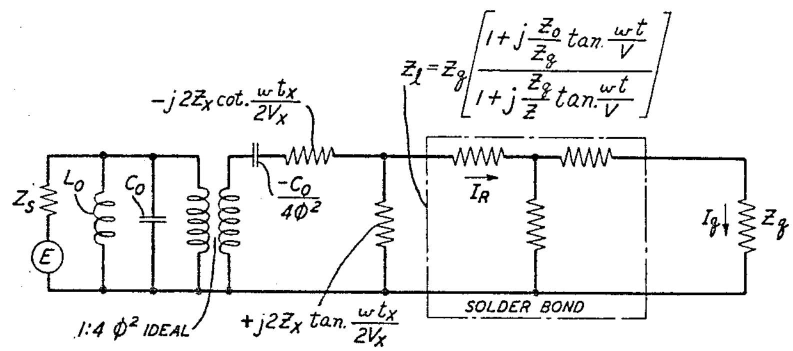
Fig. 9 shows the electrical circuit equivalent of the delay line of the invention where the crystal is loaded on one face only.

It is to be understood that the embodiments here shown and described are illustrative only of the invention, and that it is intended that the principles may be incorporated in other forms, and that other materials may be utilized within the scope of the appended claims.

Proper appreciation of the advantages of the present invention in making practical a folded solid line requires consideration of the mechanism of propagation of ultrasonic waves in a solid rod. Two general types of propagation of importance in this connection are possible in a rod when ultrasonic vibrations are impressed on one end thereof: by longitudinal waves, and by shear, or transverse waves. A solid rod conducts ultrasonic vibrations very much as a wave guide transmits microwaves. When longitudinal waves are impressed on one end of the rod, they tend to diverge. When they strike the surface of the rod, internal reflection occurs. In addition, they generate shear waves, and the result is that a series of pulses arrives at the opposite end of the line, tending to interfere with clarity of reception. Successive internal reflections along the line produce additional impulses with similar inversions of type—each incident longitudinal wave generating shear waves and in turn being reflected, and each incident shear wave generating longitudinal waves and in turn being reflected.

At the lower frequencies, transverse waves, which have a velocity of propagation about half that of longitudinal waves, appear to possess substantial advantages, as will be discussed in connection with the embodiment of Fig. 1, which is designed to operate with principal vibrations at substantially 10 megacycles.

At higher frequencies, as for example in an embodiment similar to that of Fig. 2 operating with the principal vibrations at about 60 megacycles, it may be more advantageous to use longitudinal waves, for reasons which will be discussed more fully hereafter.

A third type of propagation, that involving torsional stress, has been found useful at frequencies very much lower than those here transmitted. This type is useful within the audible range, for example.

One embodiment of a folded line is seen in Fig. 1, in which a mounting base 1 is shown supporting an input terminal box 2, an output terminal box 4, and a U-shaped folded solid line 5. Line 5 forms the mechanical path between input and output transverse mode crystal head assemblies, which are mounted within the terminal boxes, as illustrated in detail in Fig. 3. The solid line 5 is constructed of fused silica, or equivalent material such as the commercially known Corning Glass Works product, Vycor 790. It is important that the line be free from bubbles and well annealed. Other materials, such as aluminum or magnesium, may be used, but have limited application, particularly at the higher frequencies. With fused quartz or glass, the loss is substantially linear with frequency over a wide range, whereas with metals it increases rapidly at the higher frequencies. Lack of grain structure in fused quartz or glass appears to explain why the loss therein does not similarly increase with frequency.

Line 5 consists of two long parallel legs 6 and 7, joined at one end by a short transverse leg 9. The parallel relation between legs 6 and 7 is maintained by a transverse brace 10 disposed near the ends 11 and 12 opposite the rod portions joined by transverse leg 9. A number of supporting blocks 14 are provided at intervals along base 1, and line 5 is secured thereto by suitable fittings 15.

The input and output terminal boxes 2 and 4 afford protection and electrical shielding for the input and output crystal heads 16 and 17, and for the bonds between those heads and the ends 11 and 12 of the line legs 6 and 7, respectively. The crystals may conveniently be Y-cut quartz, vibrating in the transverse mode. Apertures 18 are formed in boxes 2 and 4 of greater diameter than the ends 11 and 12, so that the lines do not come into contact with the box walls. Each terminal box, as seen in Fig. 3, is provided with a conventional fitting 19 to which a coaxial cable, not shown, may be connected. Within the terminal boxes, connecting leads 20 and 21, which may be of the flat ribbon type, extend from the sleeve and center conductor, respectively, of fittings 19 to the external connecting electrodes 22 and 24 of the crystal head assemblies 16 and 17. The sleeve leads 20 are usually grounded. A common cover 25 is provided for the terminal boxes 2 and 4.

Figure 10:
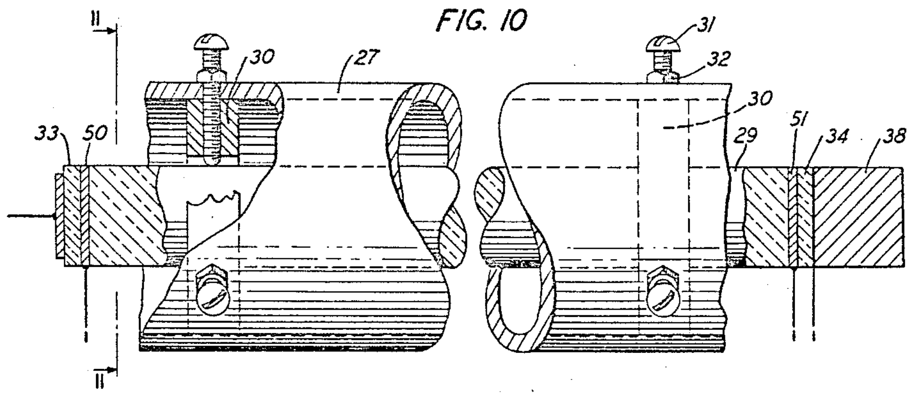
Fig. 10 is a fragmentary view, partially in section showing details of the construction of the end cells and the line of Fig. 2.
Figure 11:
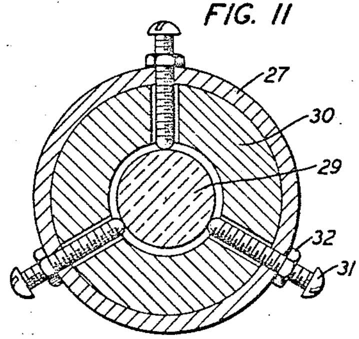
Fig. 11 is a schematic cross-sectional view, taken as indicated by line 11—11 of Fig. 10.
Figure 13:
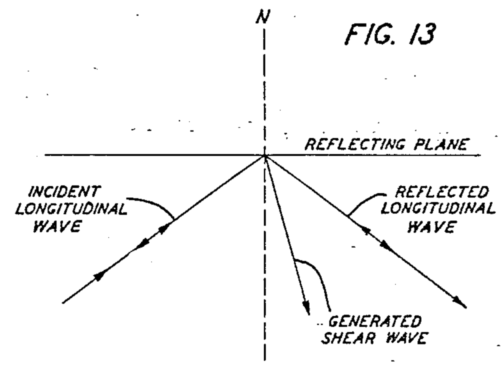
Fig. 13 shows the types of waves generated by the incidence of a longitudinal wave on a reflecting surface.

In those cases where a shorter delay period is adequate, or where compactness is not a factor, the solid line construction may be used without folding, but still using transverse mode vibrations. Such an embodiment is shown in Fig. 2. Mounting feet 26 carry a rigid tube 27, preferably of aluminum or similar light material, to furnish the mechanical support for the straight solid delay line 29, which is mounted therein. A coaxial connector 19 is secured through each of the mounting feet 26. The line 29 is centered within tube 27 by several guard rings 30, each having three supporting and adjusting screws 31 spaced equi-angularly about the line. Guard rings 30 also assist in aligning line 29 during assembly. Screws 31 are operable from outside the tube 27 and are provided with lock nuts 32, as shown in Fig. 10. This straight line construction is more appropriate for permanently emplaced structures, since the required length is over eight feet for a line giving a delay of only 672 $\mu$ seconds. For shorter delays, portable lines of this design are feasible, using either longitudinal or transverse waves.

The advantages of the folded line in ease of carrying are well illustrated by a comparison of the somewhat unwieldly embodiment of Fig. 2 with that shown in Fig. 1, which provides the same delay with only a four-foot over-all length, and is much simpler to support mechanically than the longer straight line. The same principles may be applied to the construction of still more compact lines providing the same delay, by using a plurality of reflecting surfaces and paths.

An important feature of the present invention which permits folding the line for use with transverse waves as shown in Fig. 1 is in the provision of means for reflecting the transverse waves at the corners of the bend without distortion or change of wave form. Transverse waves propagated in a solid rod are polarized. It has been found that if the transmitting and receiving crystals are aligned properly with each other, and the reflecting surfaces are carefully oriented so that they are exactly parallel with the direction of particle motion of the transverse waves, there will be no loss in the quality of the transmitted waves because of the reflection. In the prior art, severe distortions had been obtained in the output which materially limited the usefulness of the solid line.

In Fig. 4, the folded rods are shown removed from the associated apparatus which goes to make up the complete folded line. The over-all path of the ultrasonic waves through the line is indicated by the broken line 35, with the direction as shown by the arrowheads.

The corner reflectors 36 and 37 are disposed at exactly 45 degrees to the longitudinal axes of legs 6 and 7, and are ground to secure precise orientation parallel to the anticipated direction of particle motion.

While this angle has been shown in Figs. 1, 4 and 7 as being 45 degrees in order to produce a simple, symmetrical structure with two parallel legs, reflection of the ultrasonic waves may be accomplished at any other angle desired, provided the requirement discussed above is met, that is, that the reflecting surfaces be oriented properly with relation to the direction of particle motion.

The correctness of the conclusion expressed above may be verified by a mathematical consideration of the total reflection of a transverse wave from an air boundary when the direction of particle motion is parallel to the reflecting plane.

The indident wave may be written:

$$u=0$$
$$v=0$$
$$w=-\sin\omega\left(t-\frac{x}{v_t}\right) \qquad (1)$$

where $u$, $v$ and $w$ are the particle displacements in the $x$, $y$ and $z$ directions, respectively,
$\omega=2\Pi f$,
$t$=time,
$x$=distance along $x$ axis, and
$v_t$=velocity of shear wave propagation.

Only one stress, a shearing stress, will exist, and where $\mu$=shear modulus, $$x_z=\mu\frac{\partial\omega}{\partial x}=\frac{\omega}{v_t}\mu\cos\omega\left(t-\frac{x}{v_t}\right) \qquad (2)$$

Furthermore, the only surface traction will be a force in the $z$ direction:

$$z=x_z\cos\beta \qquad (3)$$

where $\beta$ is the angle of incidence.

By writing a similar equation for the reflected transverse wave, it may be shown that the corresponding traction at the reflecting plane is equal to $-x_z\cos\beta$ so that the resulting forces at the air-solid boundary are zero, as they must be. Hence, proper orientation of the crystals and reflecting surface will eliminate the objectionable results otherwise experienced with folded lines in which transverse vibrations are used.

The next consideration is the smoothing of the pass band of the line, Figs 5 to 7 being illustrative of means for accomplishing this result. In Fig. 5, line 6 is shown as having a roughened surface 39. The roughening is preferably done by chemically etching the rod, but could likewise be done mechanically. This treatment is likewise effective in the case of the 60-megacycle compressional wave line described hereafter in reducing trailing pulses. It is believed that the effect in this case is due to the scattering of the reflected energy to such a degree that no distinct trailing pulses arrive at the receiving end of the line.

In Fig. 6 is illustrated another preferred structure for improving the transmission characteristics of a line using transverse waves. About the surface of line 6 is applied a continuous sheet or layer 40 of rubber, gutta percha, acetate cloth, or similar low impedance material.

Fig. 7 shows the application of equivalent material in the form of tape 41, which may be more conveniently applied to the folded line. Friction tape, rubber tape, or the commercially known Scotch tape, a pressure-sensitive adhesive having a rubber-like base, are all examples of tape materials which have been used successfully.

By the use of these embodiments the loss characteristics may be smoothed out very substantially over the pass band, so that much more accurate reproduction of the delayed pulses is obtainable, particularly in the case of relatively long lines. One example, described hereafter, provides a 672 $\mu$s. delay. Its measured loss variation between 9 and 14 megacycles is reduced from $\pm 5$ decibels to $\pm 1.5$ decibels by wrapping. It was found that a 1 $\mu$s. pulse could be transmitted with an amplitude distortion of only 0.1 decibel, and with a reduction in spurious signals of 40 decibels down from the main pulse at 11.5 megacycles.

In short lines, the surface treatment illustrated in Figs. 6 and 7 may be effective in suppressing end-to-end reflections. In a particular line, it was found that this surface treatment had no appreciable effect on the transmission of the direct pulse, but first end-to-end reflection was reduced by as much as 6 decibels compared to its value with no surface treatment, and the second end-to-end reflection was reduced by an additional 12 decibels over the useful range.

Figure 12:
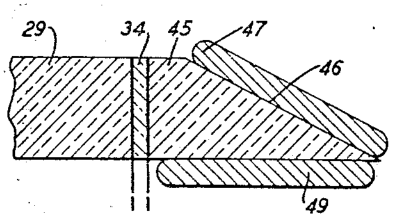
Fig. 12 is a fragmentary sectional view of an alternative end-cell construction for the line of Fig. 2.

For both short and long lines, suppression of the end-to-end reflections or echoes is also materially aided by the use of absorbing end cells, of which preferred forms are shown in Figs. 10 and 12.

In Fig. 10, reflection of waves striking the receiving crystal 34 is reduced by applying to the side of the crystal opposite that attached to the line an absorbing end cell 38, of lead or quivalent material which has a high attenuation for the ultrasonic waves. Lead-cadmium and lead-bismuth alloys have also been found very satisfactory. The impedance of fused silica is matched by a 25 per cent cadmium, 75 per cent lead alloy; and that of 790 Vycor by a 20 per cent cadmium, 80 per cent lead alloy, for example.

Another method of reducing end-to-end reflections is indicated in Fig. 12. An absorbing cell 45 of the same material as the line 29 is secured to the face of receiving crystal 34 opposite thereto. Cell 45 has one beveled face 46 disposed at an angle other than 90 degrees to the longitudinal axis of line 29. Incoming waves are reflected back and forth within the cell 45, so that their amplitude is reduced before they are returned to the line 29.

By making cell 45 of the same material as line 29, a good impedance match is obtained, reducing the amount of reflection at the crystal face. By this means alone the waves scattered by the beveled face 46 and ultimately impinging on crystal 37 could be reduced in amplitude by only 25 decibels as compared to the waves incident from line 29. A substantial additional loss was found to be obtainable by adding an absorbing layer 47 to the beveled face 46; if very high attenuation is desired, a second absorbing layer 49 may be secured to the cell 45 opposite beveled face 46. The material of which layer 47 is formed is lead or one of the alloys of lead and cadmium mentioned above. Other suitable materials may be used, for example, a eutectic of lead, cadmium and tin. With this addition, spurious waves returning to the crystal 34 could be reduced by more than 40 decibels as compared to the waves incident from line 29.

In addition to the advantage in reducnig echoes, the use of an end cell of the same material as the line itself prevents warping and breaking of the crystal due to thermal changes, which is of practical advantage with the very thin crystals used for high frequencies.

Under conditions where the use of longitudinal waves is desirable, the treatment illustrated in Fig. 5, in which a roughened surface is produced on rod 6, as by chemically etching, is found to substantially reduce distortion caused by mode conversion at the reflecting boundary of the transmitting medium. It is believed that the result is due to the scattering of the reflected portions of the longitudinal wave, so that little energy arrives in phase at the receiving crystal as a perceptible signal.

The next feature of importance in improving the transmission characteristics of the line, that of widening and flattening the pass band by the use of quarter-wave solder bonds, will be discussed in connection with the graph shown in Fig. 8, the equivalent circuit of Fig. 9, and a practical embodiment for longitudinal waves similar in external appearance to that shown in Fig. 2 for transverse waves. These figures will be considered as applicable to a line operating at 60 megacycles, the crystal vibrating at its third harmonic.

In Fig. 8 are shown curves illustrating the variation with frequency of calculated transducer loss in decibels for two lines similar except for the use in one of a quarter-wave solder bond between line and crystal. Such quarter-wave solder bonds are shown in Fig. 10 at 50 between crystal 33 and line 29 and at 51 between line 29 and crystal 34. The impedance of the solder is somewhat greater than that of the transmitting medium to provide the wide band width shown. It will be observed that the use of the quarter-wave bond substantially widens and flattens the pass band, or region of relatively low transducer loss.

Particularly at the higher frequencies, as at 60 megacycles, the bond between the crystal and the fused silica rod is of critical importance, and because of the very short wavelengths, cannot be neglected. Its effect may be seen by a consideration of the equivalent circuit shown in Fig. 9 for a crystal loaded on one face only. Approximation by lumped elements is not possible because of the large band widths involved.

In the circuit of Fig. 9, a one square centimeter cross-section is assumed, with $$\Phi=\frac{e}{t_x}=\frac{\text{piezoelectric constant}}{\text{thickness of crystal}}$$

$$Z_x=\rho_x v_x=\text{impedance of crystal}$$

$$Z_o=\rho_o v_o=\text{impedance of solder}$$

$$Z_q=\rho_q v_q=\text{impedance of transmitting medium}$$

where $\rho$ equals density and $v$ equals velocity of propagation. It is assumed also that the cross-sectional dimensions of the crystal are many wavelengths in extent and that losses in the acoustic materials themselves may be neglected.

The equivalent circuit of Fig. 9 may be readily solved by conventional mathematical procedures. The transducer loss may then be ascertained by comparing the particle velocity in the transmitting medium obtained with a given input termination with that resulting from the use of an ideal transformer to match driving generator impedance $Z_s$ to the impedance $Z_q$ of the transmitting medium. The comparison between transducer losses with and without the one-quarter wavelength solder bond may then be made as shown in Fig. 9. The use of a one-quarter wavelength thick bond gives a symmetrical band, which widens as the mechanical impedance of the bonding material increases. If the bond is not one-quarter wavelength thick, asymmetry results in the band.

While the transducer loss increases as the mechanical impedance increases, this may be offset by raising the electrical load impedance, which flattens the band and reduces the over-all loss.

The use of quarter-wave solder bonds to widen the pass band and flatten the response may be applied to liquid as well as solid delay lines. Because of the impedance relations, it has been difficult to obtain wide band widths with liquids other than mercury. With this invention, wide band variable delay lines may be made, wide band liquid cells produced for studying ultrasonic radiation over a wide frequency range, and a variety of other applications made possible.

One technique of producing the one-quarter wavelength bonds for operation at 60 megacycles employs a lead-tin-bismuth eutectic solder for satisfactory performance. The surfaces to be joined are coated with a layer of silver paste, which may be baked on, burnished, nickel-plated, and tinned. The crystal and rod may then be preheated, the crystal slid onto the rod, and a pressure of about twenty-five pounds per square inch applied. The technique should be modified, of course, to secure the proper thickness required for other frequencies.

The solders used had a somewhat higher characteristic impedance than that of the fused silica or other transmitting medium. The best solder was an eutectic consisting of 32 per cent lead, 15.5 per cent tin, and 52.5 per cent bismuth. A second solder consisted of 50 per cent lead, 15 per cent tin, and 35 per cent bismuth. Another usable solder consisted of 65 per cent lead, 24 per cent bismuth, 6 per cent tin, and 5 per cent cadmium.

Since these were low melting point solders, extremely high stresses were not set up as the solders cooled, which reduced the danger of cracking.

In summary, the invention as described permits the construction of much more compact lines by allowing multiple reflection around corners without loss of quality of the transmitted wave; it eliminates end-to-end reflections or echoes which interfere with the principal transmitted waves; it reduces the trailing pulses commonly troublesome with longitudinal waves, smooths out the pass band characteristic, and makes possible operation over wider band widths for a given transducer loss.

What is claimed is:

1. In a delay line, the combination of an input piezoelectric crystal arranged for vibration in the transverse mode, an output piezoelectric crystal arranged for vibration in the transverse mode, a solid transmitting medium connected to said input and output crystals having a transmitting path therethrough defined by a number of reflecting surfaces formed on said solid transmitting medium and oriented parallel to the direction of particle motion produced in said medium by said input crystal.

2. In a delay line, the combination of an input piezoelectric crystal arranged for vibration in the transverse mode, an output piezoelectric crystal arranged for vibration in the transverse mode, a folded solid rod connected to said input and output crystals, and reflecting surfaces formed at the folded portions of said rod and oriented parallel to the direction of particle motion produced in said rod by said input crystal.

3. In a delay line, the combination of an input piezoelectric crystal arranged for vibration in the transverse mode, an output piezoelectric crystal arranged for vibration in the transverse mode; a connection between said input and output crystals, comprising a first elongated rod joined at one end thereof to said input crystal, a transverse rod disposed normally to said first elongated rod at the end thereof opposite that joined to said input crystal, a second elongated rod disposed parallel to said first elongated rod and normal to said transverse rod, and reflecting surfaces disposed at the junctures of said transverse rod with said elongated rods and forming an angle of 45 degrees with the longitudinal axes thereof, said reflecting surfaces, being so oriented with respect to said input crystal as to be parallel to the direction of particle motion produced by said input crystal.

4. In combination with a delay line having an input piezoelectric crystal, an output piezoelectric crystal, and a transmitting medium connected to said crystals, means for reducing end-to-end reflections, comprising an absorbing section joined to one of said crystals on the side thereof opposite said transmitting medium and being formed of the same material as said transmitting medium, a beveled surface formed thereon, and an absorptive layer having an impedance substantially the same as that of said transmitting medium secured to the free surfaces of said absorbing section including said beveled surface.

5. In combination with a delay line having an input piezoelectric crystal, an output piezoelectric crystal, and a transmitting medium connected to said crystals, means for reducing end-to-end reflections, comprising an absorbing section joined to one of said crystals on the side thereof opposite said transmitting medium and being formed of material having substantially the same impedance as said transmitting medium, a beveled surface formed thereon, an absorptive layer having an impedance substantially the same as that of said transmitting medium secured to the free surfaces of said absorbing section including said beveled surface.

6. An absorbing layer for a fused silica delay line comprising a layer of solder having a high impedance relatively to fused silica, the solder in said layer comprising an eutectic mixture substantially composed of 32 per cent lead, 15.5 per cent tin, and 52.5 per cent bismuth.

7. An absorbing section of a delay line of fused silica or the like, comprising a layer of solder having an impedance substantially the same as that of fused silica or the like, comprising an alloy substantially 75 per cent lead and 25 per cent cadmium.

8. An absorbing section of a delay line of fused silica or the like, comprising a layer of solder having an impedance substantially the same as that of fused silica or the like, comprising an alloy of substantially 80 per cent lead and 20 per cent cadmium.

References Cited in the file of this patent

UNITED STATES PATENTS

| | | |
|---|---|---|
| 756,203 | Barthel | Apr. 5, 1904 |
| 1,333,666 | Luckey | Mar. 16, 1920 |
| 1,645,098 | Friedrich | Oct. 11, 1927 |
| 1,775,775 | Nyquist | Sept. 16, 1930 |
| 2,089,492 | Lambert | Aug. 10, 1937 |
| 2,150,530 | Warsing | Mar. 14, 1939 |
| 2,159,982 | Bullock | May 30, 1939 |
| 2,418,964 | Arenberg | Apr. 15, 1947 |
| 2,421,026 | Hall et al. | May 27, 1947 |
| 2,427,348 | Bond | Sept. 16, 1947 |
| 2,430,013 | Hansell | Nov. 4, 1947 |
| 2,490,452 | Mason | Dec. 6, 1949 |
| 2,495,740 | Labin et al. | Jan. 31, 1950 |
| 2,503,831 | Mason | Apr. 11, 1950 |
| 2,505,364 | McSkimin | Apr. 25, 1950 |
| 2,505,515 | Arenberg | Apr. 25, 1950 |
| 2,577,500 | Arenberg | Dec. 4, 1951 |
| 2,590,405 | Hansell | Mar. 25, 1952 |
| 2,624,804 | Arenberg | Jan. 6, 1953 |
| 2,668,529 | Huter | Feb. 9, 1954 |